(12) United States Patent
Todorov et al.

(10) Patent No.: US 11,250,245 B2
(45) Date of Patent: Feb. 15, 2022

(54) DATA-DRIVEN, PHOTOREALISTIC SOCIAL FACE-TRAIT ENCODING, PREDICTION, AND MANIPULATION USING DEEP NEURAL NETWORKS

(71) Applicants: THE TRUSTEES OF PRINCETON UNIVERSITY, Princeton, NJ (US); THE TRUSTEES OF THE STEVENS INSTITUTE OF TECHNOLOGY, Hoboken, NJ (US)

(72) Inventors: Alexander T. Todorov, Princeton, NJ (US); Stefan D. Uddenberg, Plainsboro, NJ (US); Joshua C. Peterson, Princeton, NJ (US); Thomas L. Griffiths, Princeton, NJ (US); Jordan W. Suchow, New York, NY (US)

(73) Assignees: THE TRUSTEES OF PRINCEONT UNIVERSITY, Princeton, NJ (US); THE TRUSTEES OF THE STEVENS INSTITUTE OF TECHNOLOGY, Hoboken, NJ (US)

(*) Notice: Subject to any disclaimer, the term of this patent is extended or adjusted under 35 U.S.C. 154(b) by 0 days.

(21) Appl. No.: 17/026,797

(22) Filed: Sep. 21, 2020

(65) Prior Publication Data
US 2021/0089759 A1 Mar. 25, 2021

Related U.S. Application Data

(60) Provisional application No. 62/903,267, filed on Sep. 20, 2019.

(51) Int. Cl.
*G06K 9/00* (2006.01)
*G06N 3/04* (2006.01)

(52) U.S. Cl.
CPC ..... *G06K 9/00302* (2013.01); *G06K 9/00248* (2013.01); *G06K 9/00281* (2013.01); *G06N 3/04* (2013.01)

(58) Field of Classification Search
CPC .......... G06K 9/00302; G06K 9/00281; G06K 9/00248; G06K 9/627; G06K 9/6256;
(Continued)

(56) References Cited

U.S. PATENT DOCUMENTS 8,462,996 B2* 6/2013 Moon ................ G06K 9/00315
382/118
8,965,762 B2* 2/2015 Song ...................... G10L 25/63
704/236
(Continued)

OTHER PUBLICATIONS

Oosterhof et al., "The functional basis of face evaluation", Proceedings of the National Academy of Science, vol. 105, No. 32, pp. 11087-11092, Aug. 12, 2008.
(Continued)

*Primary Examiner* — Phuoc Tran
(74) *Attorney, Agent, or Firm* — Meagher Emanuel Laks Goldberg & Liao, LLP

(57) ABSTRACT

When one looks at a face, one cannot help but 'read' it: in the blink of an eye, people form reliable impressions of both transient psychological states (e.g., happiness) and stable character traits (e.g., trustworthiness). Such impressions are irresistible, formed with high levels of consensus, and important for social decisions. Disclosed herein is a large-scale data-driven methodology that allows for the easy manipulation of social trait information in hyper-realistic face images. For example, a given face image could be made to look more or less trustworthy by moving a simple slider. Further, this method can not only generate faces, but can 'read' faces as well, providing confidence estimates of different social traits for any arbitrary image. The disclosed
(Continued)

approach is both fast and accurate, and represents a paradigm shift in facial photo manipulation.

18 Claims, 3 Drawing Sheets

(58) Field of Classification Search
CPC .......... G06N 3/04; G06N 3/08; G06N 3/0472; G06N 3/0454
See application file for complete search history.

(56) References Cited

U.S. PATENT DOCUMENTS 10,388,002 B2 * 8/2019 Ferrer .................. G06K 9/6256
11,120,526 B1 * 9/2021 Demyanov ............... G06T 5/10

OTHER PUBLICATIONS

"Look Ma, NoGAN's! Image Transformation with ModifAE", https://openreview.net/pdf?id=B1ethsR9Ym, 2019.

* cited by examiner

DATA-DRIVEN, PHOTOREALISTIC SOCIAL FACE-TRAIT ENCODING, PREDICTION, AND MANIPULATION USING DEEP NEURAL NETWORKS

CROSS-REFERENCE TO RELATED APPLICATIONS

This application claims priority to U.S. Provisional Application No. 62/903,267, filed Sep. 20, 2019, which is hereby incorporated in its entirety by reference.

BACKGROUND

State of the art in photorealistic face generation uses generative adversarial networks (GANs) that allow a fictional, realistic face to be generated. However, to date, there is no ability to generate, or modify, an image in a realistic manner such that a specific degree of a given social trait is encoded in the created image.

An example of a social trait is how trustworthy a person appears to an observer. Research has found that such impressions are formed rapidly (i.e., within 100 milliseconds of exposure to the person's face) and inform people's behavior in social settings (e.g., deciding who to trust). Although such social trait perception is subjective, in the sense that it exists entirely in observers' minds, as opposed to more objective facial attributes like nose width, it is also highly consistent across people—most people agree on who looks trustworthy, for example.

BRIEF SUMMARY

A first aspect of the present disclosure is drawn to a system for photorealistic social face-trait encoding, prediction, and manipulation. The system is based on the use of one or more processors, which may be GPUs or other appropriate processors, and such processor(s) may be on one or more remote servers, or on one or more mobile devices (such as a tablet or mobile phone).

The processor(s) are configured with machine-readable instructions, that when executed cause the one or more processors to accomplish specific tasks.

First, the one or more processors needs to encode an image of an original face as a multi-dimensional vector comprising one or more learned image features using a two-stage encoding process (e.g., an "image feature" vector). The two-stage encoding process may optionally comprise a fast approximate encoding component that is trained to predict image features given an accompanying image, and a slow encoding component having a gradient descent optimization algorithm that uses the predicted image features as the initializations, where the slow encoding component searches for image features that would result in the realistic synthetic face to have similar low-level features as the original face.

Second, the one or more processors needs to modify the multi-dimensional vector to adjust at least one subjective social trait, such as trustworthiness or dominance, based on a learned function. The learned function maps from the entire set of image features (which defines the multidimensional feature space) to subjective trait ratings. The learned function may be linear or non-linear. When this function is linear—and in preferred embodiments it is—it means that each subjective trait is modeled and/or represented as a line and/or vector that cuts arbitrarily through the multidimensional feature space. This learned function can be considered a "trait" vector related to the "image feature" vector; it is a multidimensional vector comprising coefficients for some (and preferably all) image feature in the "image feature" vector, mapping from image features to the average subjectively rating for a given trait. This learned function is also the function that is used to predict image features.

And third, the one or more processors needs to decode the modified multi-dimensional vector to generate an image of a realistic synthetic face, such as having the decoding performed by a neural network trained to generate realistic synthetic faces based on the multi-dimensional vector of learned image features.

Optionally, the system may be configured to establish the learned function defining the relationship between the subjective social trait and the one or more learned image features the adjustments to the multi-dimensional vector are based upon. The learned function will be established based on a dataset of a plurality of images. Optionally, each of the images used to teach the learned function is rated by a plurality of subjects for the subjective social trait.

Optionally, the system may be configured to establish the learned function between the subjective social trait and the one or more learned image features based on at least one other correlation or learned function between a different subjective social trait and the one or more learned image feature.

Optionally, the system may be configured to cause the one or more processors to estimate at least one feature of the original face, such as age, gender, level of perceived trustworthiness, and/or level of perceived smiling.

Optionally, the system may be configured to cause the one or more processors to transmit the realistic synthetic face to a mobile device.

Optionally, the system may be configured to cause the one or more processors to receive the image of the original face and a one or more instructions, and wherein modifying the multi-dimensional vector is further based on the one or more instructions.

Optionally, the system may be configured to cause the one or more processors to modify the multi-dimensional vector of the encoded original face a plurality of times, each time generating a different image of a realistic synthetic faces, each based on a different adjustment of the at least one subjective social trait.

Optionally, the system may be configured to cause the one or more processors to modify the multi-dimensional vector to adjust an objective appearance-based dimension.

A second aspect of the present disclosure is drawn to a method for photorealistic social face-trait encoding, prediction, and manipulation. The method involves at least four steps: (i) receiving an image of a face; (ii) mapping the image of the face to a multi-dimensional vector of learned image features using a first neural network trained to map any image of any face to a multi-dimensional vector of learned image features; (iii) adjusting a subjective social trait dimension of the image of the face by adjusting a value of at least one learned image feature based on a learned function established between the social trait dimension and the at least one learned image feature; and (iv) generating a realistic synthetic face based on the mapped image of the face and the adjusted values of the at least one learned image feature using a second neural network trained to generate realistic synthetic faces based on the multi-dimensional vector of learned image features.

DETAILED DESCRIPTION

Disclosed are a method and system for data-driven, photorealistic social face-trait encoding, prediction, and manipulation using deep neural networks. The disclosed approach allows for automatically, quickly, and realistically modifying photos of faces along a series of perceptually-derived social trait dimensions, alongside more appearance-based dimensions.

The disclosed approach may be employed, inter alfa, for artists, photographers, media companies, ad companies, governments, and social scientists who study one's reactions to people.

The method generally utilizes a system comprising one or more processors to configured with machine-readable instructions, that when executed cause the one or more processors to perform a series of tasks, that can generally be understood as encoding an image using an encoder network, modifying vectors that were encoded, and then decoding the image with the modified vectors using a decoder/generator network.

Figure 1:
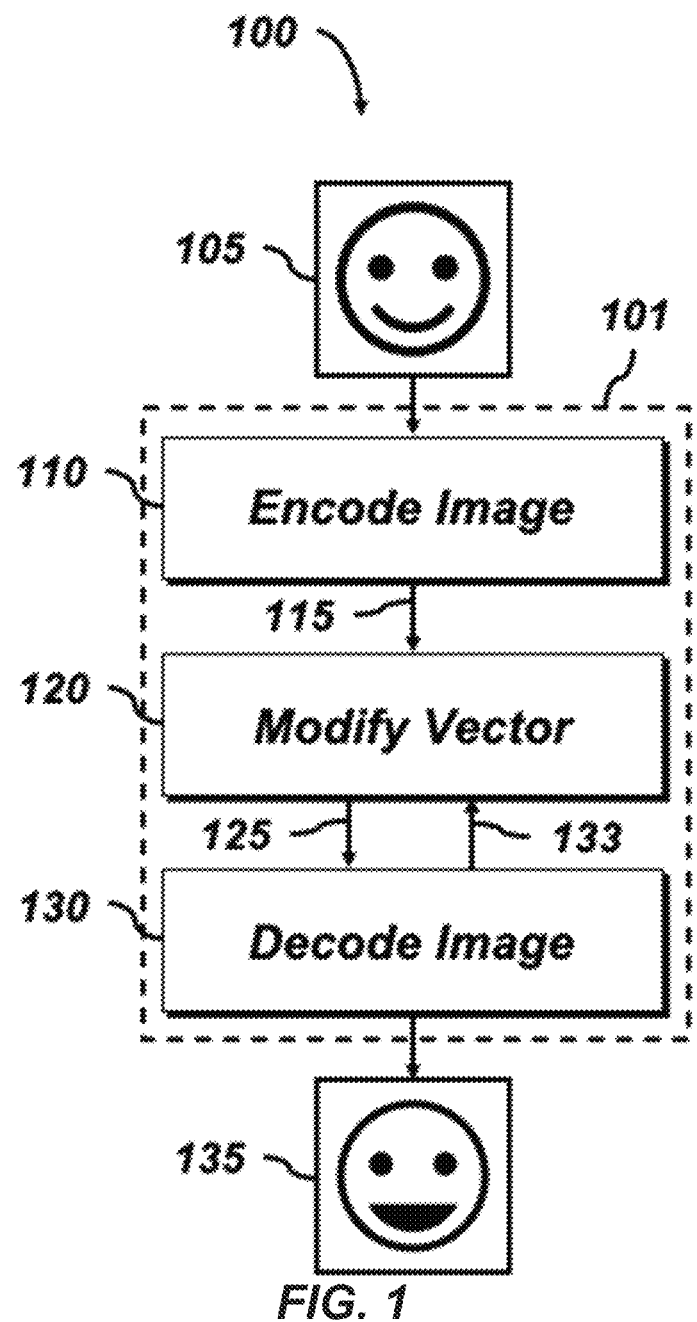
FIG. 1 depicts a simplified embodiment of a system and method according to the present invention.

FIG. 1 is a simplified depiction of an embodiment of a method according to the present invention. The method 100 first involves one or more processors 101 receiving an image of a face 105. The one or more processors may be a GPU, a CPU, or any other appropriate processor. If more than one processor is involved, the processors may be spread out across multiple components, including one or more servers and/or one or more mobile devices. The one or more processors may be configured to follow the disclosed method using a variety of arrangements, including, e.g., a stand-alone application on a computer or mobile device, or as part of a web-based application.

Encoding

The method involves the one or more processors 101 encoding 110 the image 105 as a multi-dimensional vector comprising one or more learned image features using a two-stage encoding process, which may involve mapping the image of the face to a multi-dimensional vector of learned image features using a first neural network trained to map any image of any face to a multi-dimensional vector of learned image feature.

In some embodiments, the two-stage encoding process may optionally comprise a fast encoding component that is trained to predict image features given an accompanying image, and a slow encoding component having a gradient descent optimization algorithm that uses the predicted image features as the initializations, where the slow encoding component searches for image features that would result in the realistic synthetic face to have similar features as the original face. The similar features are preferably low-level features, but may also include some high-level features as well.

As one example, in order to represent and reconstruct arbitrary external images (e.g., a photo uploaded by the user of embodiments of the present invention), one must determine the code that most closely describes the incoming photo. This is the function of an "encoding network" in the disclosed system (also referred to as the "encoder"), or the encoding 110 step in the disclosed method. GANs with accompanying encoder networks are relatively rare, and those that do exist (e.g., BiGAN or ALI) are often not effective enough to recover the identity of the input individual (the output may match the head orientation, gender, and ethnicity of the input face only). Additionally, training GANs with accompanying encoding networks is another potentially destabilizing factor that must be optimized during training.

The disclosed methods and systems sidestep these issues when using a two-stage encoding process. First, an encoder network is trained posthoc (i.e., after, and not in tandem with the decoder network) to predict a large number of image features given an accompanying image, e.g., images generated from a decoder/generator network. In some embodiments, the number of predicted image features predicted is at least 5,000; 50,000; 250,000; or 500,000, and less than 10,000,000; 1,000,000; 500,000; 250,000; 150,000; 50,000; and 15,000. This fast encoder may be, e.g., a convolutional neural network, such as one that is at least 50 layers deep, that was pretrained on a known dataset (such as the VGG Face Dataset, where the top classification layer as removed and a dense regression layer was added). The predicted image features from the first network are then used as the initializations for a slower encoding process. In this second process/second network, a stochastic gradient descent and variants (e.g., Adam) can be used to search for the image features that cause a generator to output images with similar low-level feature representations as the input images (i.e., a perceptual loss from VGG16 trained on ImageNet).

Modifying

Referring back to FIG. 1, the output 115 from the encoding network/encoding step 110 is a multi-dimensional vector comprising one or more learned image feature. That multi-dimensional vector is then modified 120 in a specific manner. A subjective social trait dimension of the image of the face is adjusted by adjusting a value of at least one learned image feature based on a learned function (which may be linear or non-linear, and is preferably linear) established between the social trait dimension and the at least one learned image feature. The learned function may relate the social trait dimension to a plurality of image features. In some embodiments, the subjective social trait comprises "trustworthy"/trustworthiness, "dominant"/dominance, "smart"/intelligence, age, masculine/feminine, perceived memorability, outgoing, familiar, happy, attractive, and/or skinny/fat.

In some embodiments, the system/method also includes modifying the multi-dimensional vector to adjust an objective appearance-based dimension, such as color of skin, appearance of freckles, etc.

Generally, the learned function is learned via a mapping (such as a linear mapping) which typically consists of a set of coefficients, one for each input image feature, where higher coefficients reflect the importance of the feature in predicting the trait. Typically, there will also be a single, learned bias term, which is the mean value of the trait when all image features are 0. These functions are typically learned using a "least squares" procedure (which is well-known to those of skill in the art). Further, the learned coefficients are "regularized", also using well-known techniques. In preferred embodiments, the effect is that the learned function is rewarded for accuracy (as is normally the case), but also jointly for pushing coefficients towards 0 (i.e., assuming more features are less useful). The strength of this effect can be chosen based on a standard "cross-validation"

procedure, where one attempts to predict held out data unseen by the model for training.

Modification can occur by modifying the multi-dimensional vector of images features that describe any one face based on the learned function. When the learned function is linear, the learned weights of the linear function constitute another, single vector that is a representation of any one trait being learned (e.g., trustworthy), which can be used to transform the multi-dimensional vector corresponding to any particular face image (i.e., the modified multi-dimensional vector=the multi-dimensional vector+(the vector provided by the learned function x some scalar free parameter that controls the strength of the transformation)). Transformations of different strengths correspond to statistical inferences (via the learned function) as to the mean judgment that we would expect humans to assign to the output image. When the learned function is nonlinear, it can be represented as a multi-layer neural network. To transform faces using this model, a separate optimization process using gradient descent can search for the smallest possible change to the input vector that increases the output mean trait prediction by the desired amount.

In one embodiment, processors (which may be the same one or more processors, or may be other processor(s)) are configured with machine-readable instructions, that when executed, cause those processor(s) to establish the correlation between the subjective social trait and the one or more learned image features the adjustments to the multi-dimensional vector are based upon. This is typically done by training a separate machine learning algorithm. For example, in one embodiment, the learned function is established based on a dataset of a plurality of images of different individuals, where each of the images is rated by a plurality of subjects for the subjective social trait. In some embodiments, the plurality of images comprises at least about 1,000; at least about 2,500; at least about 5,000; at least about 10,000; at least about 50,000; or at least about 100,000 images. In some embodiments, the plurality of images is less than 200,000; less than 100,000; less than 50,000; less than 10,000; less than 5,000; or less than 2,500 images. In some embodiments, the number of subjects that each image is rated by is at least 25; at least 50; at least 100; or at least 200 subjects. In some embodiments, the number of subjects that each image is rated by is less than 500; less than 250; less than 100; or less than 50 subjects.

In some embodiments, the learned function between the subjective social trait and the one or more learned image features is established based on at least one other correlation or learned function between a different subjective social trait and the one or more learned image features. That is, in some embodiments, if the system has correlations for a person's "friendliness" and "respectfulness" social traits, but a user desires to adjust "kindness" (which does not already have a correlation provided), the system may create a correlation based on, e.g., either of the two known traits, or a combination thereof.

Figure 2:
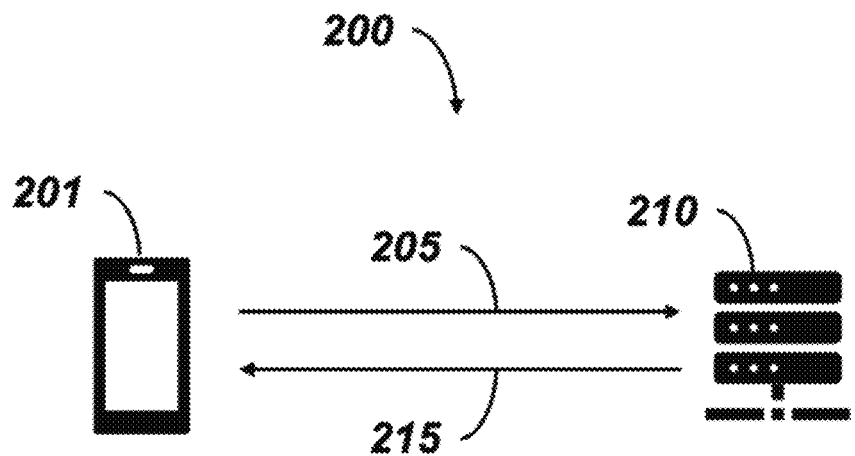
FIG. 2 depicts a simplified system according to an embodiment of the present invention.

In addition to receiving the images of one or more faces, other elements can be provided to the one or more processors. For example, as illustrated in FIG. 2, the system 200 may include a mobile device 201 with a processor that is running an application to capture a face using a camera on the mobile device. The application may then transmit a signal 205 containing the captured image(s) and instructions. That signal 205 containing the image(s) and the instructions is then received by one or more processors on a remote server 210. In some embodiments, the modification step 120 modifies the multi-dimensional vector based on the learned function and the one or more instructions (e.g., that describe what social features to adjust, and to what degree). For example, a user could send to an application programming interface (API) a batch of images and instructions to modify the vectors to make each person 20% happier. The system would then perform its functions based on the learned function and the instructions provided, rather than including any further interaction with the user. In some instances, the instructions also include one or more learned functions for the system to use for modification purposes. For example, a user could send over instructions that describe a learned function for how inquisitive a person looks (e.g., such as a vector representing the "inquisitive" visual trait), and then instruct the system to adjust the multi-dimensional vectors for a given image to make it 15% more inquisitive.

For example, manipulating psychological traits requires capturing such traits in human behavior and associating them with the features of image encodings. To first capture these psychological traits, crowdsourcing can be employed to acquire human judgments of each trait for a sufficiently large set (i.e., thousands to tens of thousands) of images. Since humans exhibit some disagreement in their judgments (e.g., level of perceived trustworthiness on a scale from 0 to 10, or preferably 1 to 100), many individual judgments must be obtained for each image, and the average is taken as the final value. In contrast to previous work in psychology research, which is mainly concerned with establishing significant statistical effects, obtaining a larger number of ratings per image reduces noise in the final estimates of each trait for each image, and allows for a higher quality mapping to the image encoding later on. Additionally, the image set should use randomly generated images from a GAN generator instead of real images, since real images must be encoded, which would introduce another potential source of noise.

The human judgments are related to the feature encoding using, e.g., linear models, which are simple yet highly robust, and appropriate given the ratio of encoding features (i.e., dimensionality) to the amount of human data that can be feasibly collected. Specifically, one can learn linear factors $w=w_1, w_2, \ldots, w_d$ via linear models of the form: $y_i = w_1 z_{i1} + w_2 z_{i2} + \ldots, + w_d z_{id}$, where $z_{ij}$ is the encoding dimension j for image i and $y_i$ is the average trait judgment for image i.

Since the dimensionality of z is large, one can employ a number of regularization strategies including: (i) L1 and L2 weight penalties; (ii) Stepwise or ordered or random removal of features that may not be relevant; (iii) Sparse evolutionary training (SET), typically only used for neural networks; (iv) Since many GANs (including, e.g., StyleGAN) technically use several sets of z vectors to encode low- to high-level information about each image, one can select only the subsets necessary to predict y well. Once learned, images can be transformed along each learned latent factor w in the encoding space by adding or subtracting a scalar multiple of w to the image encoding.

Lastly, as opposed to learning a single factor for each psychological trait, one can also learn a set of factors, each associated with a cluster of like-minded human participants. This allows for future profiling and user-targeted manipulations.

The linear models above are evaluated in terms of their predictive performance, measured using the proportion of variance explained (coefficient of determination or $R^2$) on a hold set of images and their average judgments (i.e., how well do they generalize in predicting psychological traits for unseen images). However, this process evaluates only the average performance of the model. To provide confidence estimates of our predictions and transformations of the psychological traits of individual faces, one can fit Bayesian variants of the linear models above. In this case, regularization strategies are interpreted as priors that constrain the final posterior weight distributions (which in turn yield distributions over predictions, which may be high or low variance). Single, image-wise predictions with low variance are quantitatively justified in this way. High variance predictions can be flagged as such to the user to avoid failed manipulations.

Decoding

Referring back to FIG. 1, the output 125 from the modification step 120 is a modified multi-dimensional vector, where the only differences between the original multi-dimensional vector 115 and the modified multi-dimensional vector 125 are those relating to the adjusted subjective social trait dimension(s).

That modified multi-dimensional vector is then provided to a decoder/generator network that generates a realistic synthetic face based on the mapped image of the face and the adjusted values of the at least one learned image feature using a second neural network trained to generate realistic synthetic faces based on the multi-dimensional vector of learned image feature. That is, the decoder/generator network decodes 130 the modified multi-dimensional vector 125 to create a modified, realistic face 135. In some embodiments, each modified, realistic face 135 is then displayed.

In preferred embodiments, decoding is performed by a neural network trained to generate realistic synthetic faces based on the multi-dimensional vector of learned image feature.

The model in FIG. 1 resembles a network commonly referred to as an autoencoder, a neural network that is trained to compress images into a relatively small list of numbers before reconstructing the original image as accurately as possible. While this compressed representation (and therefore its corresponding originating image) can be easily manipulated in the disclosed method, the output reconstructions of such networks are often too blurry to be considered realistic (e.g., their smooth appearance gives away to the viewer that they are synthetic). Instead, one can take as the decoder of the system the "generator" from a generative adversarial network A generative adversarial network (GAN) has two components: (15) a generator network, which learns to map from random vectors—lists of random numbers that are typically constrained to be close to zero on average—to images (i.e., faces) that "look" as realistic as possible, and (2) a discriminator network which learns to discriminate between real images and those synthesized by the generator. When trained in tandem, correctly, and for long enough, generator networks typically produced much more realistic output images than autoencoders. One can use any known generator of this type, including, e.g., the generator from a state-of-the-art GAN developed by NVIDIA called StyleGAN, and then discard the discriminator. That is, embodiments of the system are preferably free of a discriminator network. As these generators are pretrained to produce images resembling those in face databases (such as the publicly available FFHQ face dataset), in some embodiments, the decoder/generator network is not further trained at any stage.

In some embodiments, modification of the values is done in real-time, using sliders or other known graphical user interface (GUI) components, via an iterative process of modifying 120 the original vector 115 to create a modified vector 125, decoding 130 the modified vector 130, then going back 133 to the modification step 120 to allow the original image 105 to be further modified. As the GUI component(s) is/are adjusted, the decoder creates the modified, realistic face 135.

Referring to FIG. 2, in some embodiments, the one or more processors 210 can also be configured to transmit 215 the realistic synthetic face to a mobile device.

Figure 3:
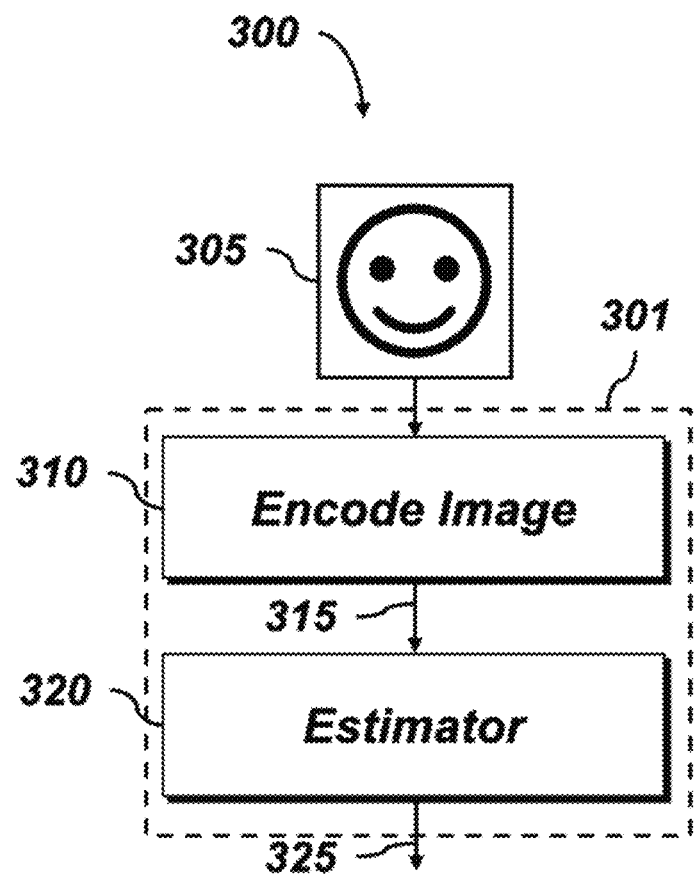
FIG. 3 depicts an alternate embodiment of a system and method according to an embodiment of the present invention.

Referring to FIG. 3, in some embodiments of the system/method 300, the one or more processors are configured with machine-readable instructions, that when executed cause the one or more processors 301 to estimate 320 at least one feature of the original face 305, such as age, gender, level of perceived trustworthiness, and/or level of perceived smiling. Generally, the estimator/estimation step 320 follows the encoding of the image 310 into a multi-dimensional vector 315. The estimator/estimation step 320 estimates at least one subjective social trait based on the learned function or correlation between the subjective social trait and the one or more learned image features in the multi-dimensional vector, as described above.

In some embodiments, only the mean of the estimate is provided, while in others the estimated range within a given confidence interval (such as 99%, 95%, or 90% confidence interval) is provided. That is, a face may be estimated as being from a person aged 20-30 with a 90% confidence interval, with a mean estimate of 25; in some embodiments, the age is reported only as 25 (a specific age), in some it may be reported as 20-30 (a range of ages). For example, the system can be configured such that the output from the encoder, the modification step, or the decoding step, is an estimate of age of the person whose face is included in the image. In some embodiments, an estimate of the subjective social trait being modified is provided. In other embodiments, an estimate of a subjective social trait other than the one being modified is provided. For example, if an image is modified to adjust the degree of happiness of a person, the system or method might provide estimates of the trait being modified (happiness) as well as one or more traits that are not being modified (e.g., age and trustworthiness).

Figure 4:
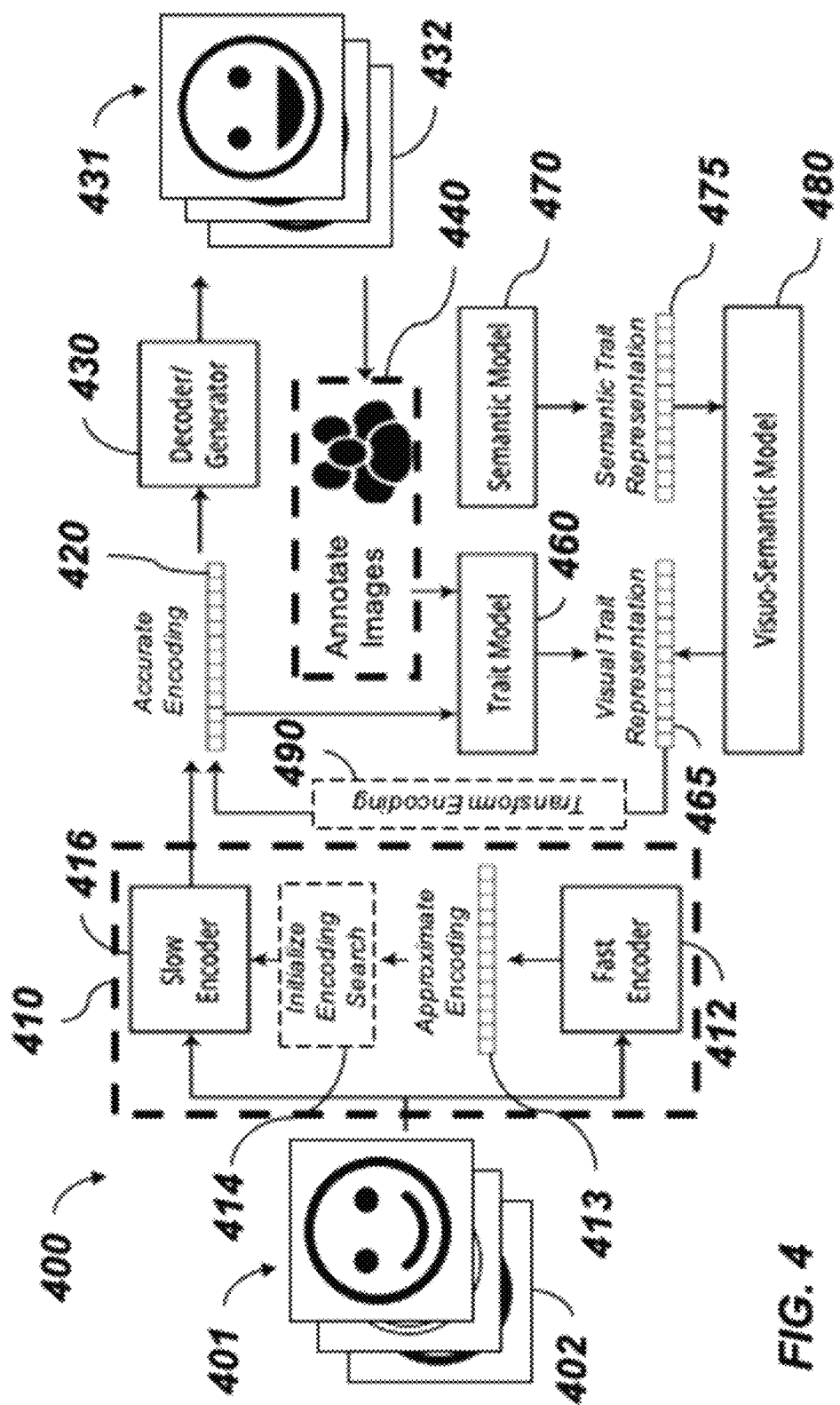
FIG. 4 depicts an alternate embodiment of a system and method according to an embodiment of the present invention.

Other embodiments can be best understood in view of FIG. 4. In one way, the disclosed approach above can be considered as dealing with the systematic mapping from image features to trait judgments. However, in another way, it can also be considered to deal with the mapping from image features to words. Learning a mapping from image features to new words (i.e., traits) requires new human judgment datasets, as described previously. However, the idea that this system maps image features to words can be exploited in order to capture new traits without collecting additional human data.

In some embodiments, the system or method 400 generally utilize one or more processors that are configured with instructions (that may be stored on non-transitory computer readable media) that, when executed, cause the processors to perform certain actions. Generally, those actions begin with receiving input 401, which may contain one or more images of a face 402, and optionally instructions related to a request to modify the images (not shown). As described previously, the instructions may provide, for example, details about what trait should be modified, and to what degree. The instructions may also include user information (e.g., username, password, etc.), specific learned functions for use in the system, information related to where to send the processed images, information related to the format of the output (e.g., a specific image or video format), or information related to privacy and/or any encryption of the input or output images. This information may be provided to the system (including, e.g., via an application programming interface (API) used by the system) in any appropriate manner known to those of skill in the art.

These images are provided to an encoder 410, which as described above may comprise a fast encoder 412 that may generate an approximate encoding vector 413 of each image of a face 402. The approximate encoding vector 413 may optionally be used to initialize an encoding search within the slow encoder 416. The output from the encoder 410 generally, and the slow encoder 416 specifically in FIG. 4, is an accurate encoding vector 420, which is a vector representing features of a single image (i.e., the multi-dimensional vector previously discussed). The accurate encoding vector 420 can then be modified or transformed to adjust a visual trait (i.e., the subjective traits) as previously discussed. The accurate encoding vector 420, after modification or transformation, is then passed to a decoder/generator 430, which outputs the reconstructions, samples, and/or transformations 431, which includes one or more images 432 that have been modified or transformed based on the image of a face 402. In some variants, the some or all of the images 432 that are output from the decoder 430 can then be passed to human participants or users, who can annotate or rate those images for a given subjective trait. Those annotated or rated images can be provided to a trait model 460.

The trait model 460 may be a linear or nonlinear, and preferably linear, function or model that maps image features to average ratings for each image in a given dataset, which also yields a single vector for each trait, the visual trait representation 465 (i.e., a learned function). If no semantic model is used, the visual trait representation 465 can be used to modify or transform the accurate encoding directly (not shown in FIG. 4). Based on input that is received from a user, the system will determine which visual trait representation 465 will be used to modify the image. That is, if the user requests the system make a face 10% more trustworthy, the system will, if necessary, determine that it needs to use a "trustworthy" visual trait representation. If the system is configured to only modify a single trait, no such determination step is required.

However, as shown in FIG. 4, a semantic model 470 may sometimes be used. The semantic model 470 may be any model that generates/provides a single vector (semantic trait representations 475) to represent any given word. A skilled artisan will recognize there are many known techniques or algorithms capable of performing this step, including, but not limited to, "word2vec" or "GloVe".

The semantic trait representation 475 is then passed to a visuo-semantic model 480. The visuo-semantic model 480 can be linear or nonlinear, and maps arbitrary semantic trait representation(s) 475 to corresponding visual trait representations 465. For example, it can map a "trustworthy" word vector to a "trustworthy" visual trait vector. This function/model may also be "bijective", also called "invertible", meaning one could enable the reverse mapping too. That is, one skilled in the art could also enable the mapping of a visual trait vector to a word vector.

This approach can allow the disclosed systems to receive a request to modify an arbitrary term suggestive of visual trait and, if the visual trait representation 465 is not already known, the system can generate an visual trait representation 465 that corresponds to the arbitrary term, and that generated representation can then be used to modify the accurate encoding vector 420 as requested.

For example, word vector models learn from large datasets of text to map from words to a set of semantic features, such that words close together in this feature space are more semantically similar (e.g., "happy" and "joyful"), and occur more frequently in similar contexts in the training corpora. If one maps image features to semantic features, then new traits can be derived in the image feature space for arbitrary words. In particular, on the basis of existing trait data, one can model the correlation between semantic features of a word and the image features to which it was already mapped. The quality of this mapping will depend on the number and diversity of original traits the system has learned functions for. With a large enough set of learned functions (at least 15, preferably at least 25, and more preferably at least 50), one can then take any word in the semantic space and produce a corresponding trait in the image space.

This may be accomplished using, e.g., a mathematical framework called Bayesian Tensor Factorization with Side Information (See Porteous et al., 2010 and Simm et al., 2015, both of which are hereby incorporated herein in their entirety). In particular, the annotated images 440 can be represented of as a three-dimensional tensor in which rows represent participants, columns represent images of faces, planes represent traits, and cells are occupied by the annotation: the rating that the given participant made for the given face along the given trait. This tensor is typically necessarily sparse, because not every participant can be asked to rate every one of thousands of faces, much less along every attribute of face representation. The factorized tensor serves as a visuo-semantic model 480 by finding a lower-dimensional representation of the image annotations 440 expressed in terms of a semantic trait representation 475, a visual trait representation 465, and a participant representation. In addition, the predictive power of the system can be enhanced by "side information"—available information that is uniquely associated with participants (e.g., demographic data of the participants, such as their age or gender identity), faces (e.g., latent representational features in the GAN's space), or traits (e.g., latent representational features from a semantic model 470). With this side information, the visuo-semantic model 480 may be expressed as a combination of (a) the product of the visual trait representation 465, the semantic trait representation 475, and a learned participant representation, (b) some function of the participants' side information, (c) some function of the faces' side information, and (d) some function of the trait's side information.

For example, suppose that one has collected large amounts of data for the traits "trustworthiness" and "happiness", and produced reliable models for each of those. The words "happiness" and "joyfulness" can be thought of as vectors in a meaningful word space (or word embedding, e.g., utilizing word2vec, though other known techniques can be used), and so the models describing them can be situated in some sense within that space. Other words (and essentially all words within a particular language, such as English) can similarly be represented within such a semantic space. Knowing this, one can infer what a model for a previously unused word (e.g., "cheerfulness") would look like, by noting its position in the space relative to the words for which one has copious data (as via metrics such as cosine similarity). So in this example, perhaps the inferred "cheerfulness" model is one that looks quite similar to—but not the same as—"happiness" and "joyfulness", given that "cheerfulness" is relatively close to both of those words within the semantic space.

In a similar fashion, one can infer what a particular user's ratings would be for a given face even for traits that they have never rated before—provided that one had collected a large number of other ratings for other trait attributes from that same user. In practice, this process is mathematically similar to how many companies today recommend new products to their users via recommendation engines. Here one applies the same logic to trait attribute ratings of faces, rather than to ratings of movies, games, magazines, etc.

Referring back to FIG. 4, the visual trait representation 465 corresponding to a requested trait to be modified can be used to transform or modify the encoding of the image as described previously. That is, the visual trait representation 465 can be used to modify the accurate encoding 420 of the images of faces 402, prior to being sent to the decoder/generator 430.

Those skilled in the art will recognize or be able to ascertain using no more than routine experimentation many equivalents to the specific embodiments of the invention described herein. Such equivalents are intended to be encompassed by the following claims.

What is claimed:

1. A system for photorealistic social face-trait encoding, prediction, and manipulation, comprising one or more processors configured with machine-readable instructions, that when executed cause the one or more processors to:
   a. encode an image of an original face as a multi-dimensional vector comprising one or more learned image features using a two-stage encoding process;
   b. modify the multi-dimensional vector to adjust at least one subjective social trait based on a learned function between the subjective social trait and the one or more learned image features in the multi-dimensional vector; and
   c. decode the modified multi-dimensional vector to generate an image of a realistic synthetic face.

2. The system according to claim 1, wherein the one or more processors are further configured with machine-readable instructions, that when executed cause the one or more processors to establish the correlation between the subjective social trait and the one or more learned image features the adjustments to the multi-dimensional vector are based upon.

3. The system according to claim 2, wherein the correlation is established based on a dataset of a plurality of images, each of which is rated by a plurality of subjects for the subjective social trait.

4. The system according to claim 3, wherein the plurality of images comprises at least 1,000 images, and the plurality of subjects comprises at least 25 subjects.

5. The system according to claim 1, wherein the correlation between the subjective social trait and the one or more learned image features is established based on at least one other correlation between a different subjective social trait and the one or more learned image feature.

6. The system according to claim 1, wherein the one or more processors are further configured with machine-readable instructions, that when executed cause the one or more processors to estimate at least one feature of the original face.

7. The system according to claim 6, wherein the at least one estimated feature is selected from the group of features consisting of age, gender, level of perceived trustworthiness, and level of perceived smiling.

8. The system according to claim 1, wherein the one or more processors are present on one or more servers.

9. The system according to claim 1, wherein each of the one or more processors are a graphics processing unit (GPU).

10. The system according to claim 1, wherein the one or more processors are further configured with machine-readable instructions, that when executed cause the one or more processors to transmit the realistic synthetic face to a mobile device.

11. The system according to claim 1, wherein the one or more processors are further configured with machine-readable instructions, that when executed cause the one or more processors to receive the image of the original face and a one or more instructions, and wherein modifying the multi-dimensional vector is further based on the one or more instructions.

12. The system according to claim 1, wherein the one or more processors are further configured with machine-readable instructions, that when executed cause the one or more processors to modify the multi-dimensional vector of the encoded original face a plurality of times, each time generating a different image of a realistic synthetic faces, each based on a different adjustment of the at least one subjective social trait.

13. The system according to claim 1, wherein two-stage encoding process comprises a fast encoding component that is trained to predict image features given an accompanying image, and a slow encoding component having a gradient descent optimization algorithm that uses the predicted image features as the initializations, where the slow encoding component searches for image features that would result in the realistic synthetic face to have similar features as the original face.

14. The system according to claim 1, wherein decoding is performed by a neural network trained to generate realistic synthetic faces based on the multi-dimensional vector of learned image feature.

15. The system according to claim 1, wherein the at least one subjective social trait comprises trustworthiness or dominance.

16. The system according to claim 1, wherein the one or more processors are further configured to modify the multi-dimensional vector to adjust an objective appearance-based dimension.

17. The system according to claim 1, wherein the one or more processors are further configured to map an arbitrary semantic trait representation to a corresponding visual trait representation.

18. A method for photorealistic social face-trait encoding, prediction, and manipulation, comprising the steps of:
   a. receiving an image of a face;
   b. mapping the image of the face to a multi-dimensional vector of learned image features using a first neural network trained to map any image of any face to a multi-dimensional vector of learned image feature;
   c. adjusting a subjective social trait dimension of the image of the face by adjusting a value of at least one learned image feature based on a linear correlation established between the social trait dimension and the at least one learned image feature;
   d. generating a realistic synthetic face based on the mapped image of the face and the adjusted values of the at least one learned image feature using a second neural network trained to generate realistic synthetic faces based on the multi-dimensional vector of learned image feature.

* * * * *